Sept. 9, 1969  J. E. BIGELOW  3,466,651
SIGNALLING SYSTEM
Filed Dec. 23, 1966  2 Sheets-Sheet 1

INVENTOR.
JOHN E. BIGELOW
BY
HIS ATTORNEY

Sept. 9, 1969  J. E. BIGELOW  3,466,651
SIGNALLING SYSTEM
Filed Dec. 23, 1966  2 Sheets-Sheet 2
FIG. 5
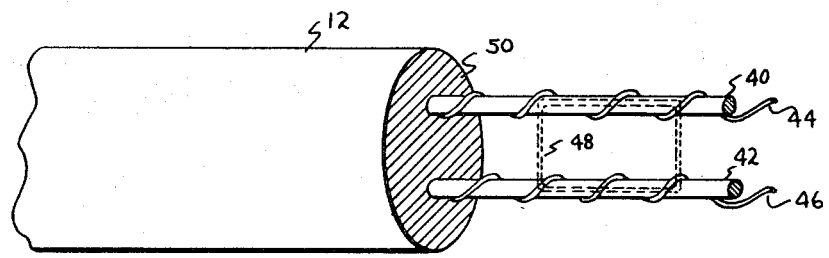
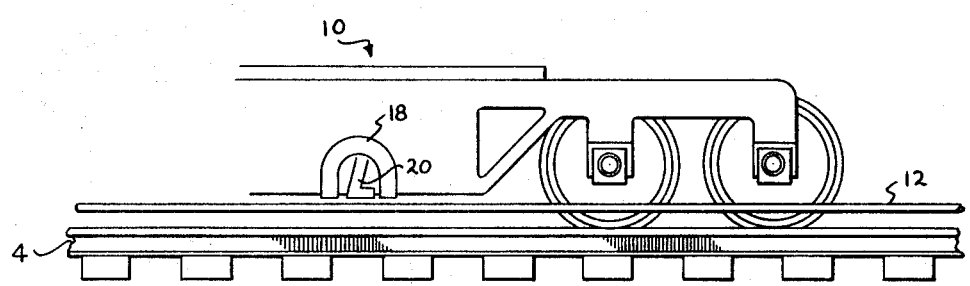
FIG. 6
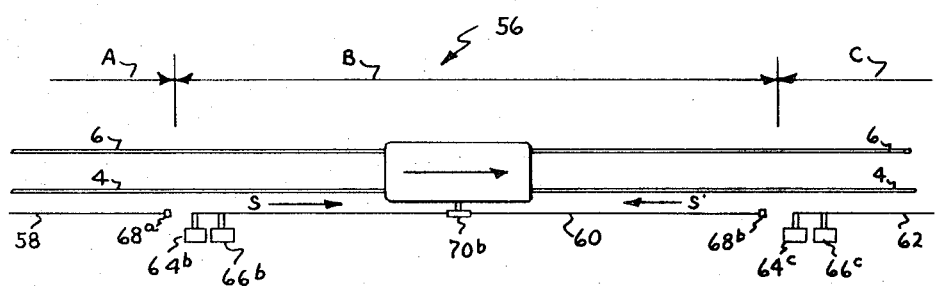
FIG. 7
INVENTOR.
JOHN E. BIGELOW
BY *Joseph V. Claeys*
HIS ATTORNEY 3,466,651
SIGNALLING SYSTEM
John E. Bigelow, Schenectady, N.Y., assignor to General
Electric Company, a corporation of New York
Filed Dec. 23, 1966, Ser. No. 604,377
Int. Cl. G01s 1/06
U.S. Cl. 343—13    11 Claims

ABSTRACT OF THE DISCLOSURE

A signalling system having a transmission line carrying signal energy, parallel to the right of way, and incorporating conductors having an associated saturable magnetic shield for minimizing the residual field in the region external to the transmission line. A magnetic member, which may be carried on a vehicle, saturates the transmission line at a localized region adjacent to such member to permit coupling of signal energy between the line and the vehicle and to reflect back signal energy to the source of signal energy.

---

This invention relates to signalling systems, and more particularly relates to such systems for use in controlling, and detecting vehicles and/or communicating between vehicles. Although this invention may be utilized in the detection and control of vehicles generally, it is especially suitable for use in detecting, controlling or communicating between vehicles such as cars, trains or the like, of the type which are movable along a track and will be particularly described in that connection.

In the automatic control of rail or track vehicles of the character described, it has been necessary to control the travel of a vehicle relative to the position of another vehicle travelling in advance thereof and on the same track to avoid sudden stoppings or actual collision between the vehicles. To the accomplishment of this purpose, in one heretofore known system the location of the advance vehicle has been determined by dividing the rails or tracks into a series of electrically isolated zones wherein the identification of the zone in which the advance vehicle was located was suitably communicated to a succeeding vehicle. In this arrangement, the presence of the advance vehicle was detected by the effects which the advance vehicle had on the electrical conditions on the rails or tracks in the zone in which the advance vehicle was located. Each zone included a transmitter which continuously generated a signal within the zone and a detector for sensing any impedance change within the zone. Moreover, when the advance vehicle entered the zone, the wheel and axle assembly thereof imparted a shunting impedance across the tracks which was sensed by the detector to indicate zone occupancy. This occupancy information was relayed back to the succeeding vehicle which was programmed in a manner so as to respond to the occupancy condition. Such zone control systems, however, have been found to have inherent disadvantages, particularly under adverse weather conditions. Since nature's elements, such as rain, snow, ice, or the like, also act to place a shunting impedance across the track, it has been found that such systems require costly and sensitive detection equipment in order to distinguish between the shunting effects caused by vehicle occupancy as opposed to those caused by the weather conditions which may exist in proximity to the track. Furthermore, it has been found that the operating efficiency of such systems has been appreciably reduced as a result of adverse weather conditions.

In another heretofore known system, the zone arrangement was eliminated, and a radar device was mounted on each vehicle. In this system, a ranging signal was transmitted from the succeeding vehicle toward an advance vehicle along a transmission line which paralleled the tracks. This signal was reflected from a point adjacent the advance vehicle so that the elapsed time interval between transmission and receipt of the signal gave an indication of the location of the advance vehicle. In such a system, the radar transmission line was generally of an open construction and reflection was accomplished by a shorting element of the type disclosed in the U.S. Patent 2,702,342 to Korman. In this arrangement, however, the open construction of the transmission line caused excessive attenuation due to the presence of moisture, such as contributed by snow, ice, wet ballast and the like; and due to the shunting impedances resulting from the location of the transmission line in close proximity to the tracks. Furthermore, the reflecting devices carried by the advance vehicle in such systems were not entirely satisfactory in reflecting the transmitted signals. With such arrangements, the signal had the tendency of "seeing around" the reflector which resulted in a confusion between the reflection from a vehicle further down the track and the reflection from the nearest vehicle on the track.

In another similar system, a quasi-radar method was employed which utilized a transmission line having a pair of conductors surrounded by a dielectric. The couplings between the trains and the conductors were a direct inductive coupling which transmitted a signal along the line. The reflection of the signal from an advance train was caused by the change in line impedance caused by the metal in the wheels of the advance train or by a special suspended metal bar, or by a coupled signal as disclosed in U.S. Patent 2,641,688 to Adams or by a high frequency "electric lantern" as disclosed in U.S. Patent 2,636,113 to Deloraine. Such systems were not satisfactory. For example, a problem occurred in preventnig reflections due to stray pieces of metal such as rails, spikes, etc. As a result, it was necessary to place a metal half-shield about the transmission line to prevent reflections from the rails, however the unshielded portion was still exposed to adjacent stray metal. A further disadvantage occurred where the line passed under a cross-over in that it was necessary to establish a blind spot by completely shielding the cable and progressively varying the size of transmission line to maintain uniformity of line characteristics. In addition to being complex, there was no reflection at the cross-overs. As a result, undesirable blind spots were created. Such reflective coupling arrangements, however, are not only subject to impedance irregularities and the aforementioned "seeing around" effects, but are not entirely satisfactory in providing an efficient coupling with the transmission line due to the effects of other metal parts, such as rails, spikes or other metallic objects adjacent the track.

Accordingly, an object of the present invention is to provide an improved signalling system for the automatic and continuous control, detection, and/or communication for and with vehicles of the character described.

Another object of the invention is to provide a system of the character described which is efficient and economic in operation; which provides improved control, detection and/or communication under all weather conditions; and which is relatively immune to shunting and leakage defects due to the presence of natural elements such as rain, snow, ice or the like in proximity to the right of way.

A further object of the invention is to provide a system of the character described which incorporates an improved construction for a transmission line which is not affected by adverse weather conditions or other effects adjacent the right of way; which enables quick and efficient coupling of a signal at any given point along its length; and which minimizes shunting effects between the line and the rails.

Another object of the present invention is to provide a system which incorporates a transmission line and coupling arrangement of the character described which enables a signal to be transmitted from a succeeding vehicle and reflected back from an advance vehicle travelling on the same track without the undue effects of "seeing around" the advance vehicle.

A still further object of the present invention is to provide a system of the character described which enables simultaneous use of wide band communication, vehicle block occupancy detection and separation measurement between two or more vehicles without the need for additional paralleling signal paths.

The invention generally contemplates the provision of a transmission line paralleling the right of way and incorporating conductors having a magnetically permeable means thereabout. There is also provided means for transmitting an energy signal along the transmission line and magnetic means mounted on an advance rail vehicle operative to cause local saturation of the magnetically permeable means with consequent reflection of the energy signal adjacent the position of the rail vehicle. Further means are provided for receiving the reflected signal adjacent the source of transmission. In one form of the invention, the signal is generated by a transmitter on a succeeding rail vehicle which also carries a magnetic means which locally saturates the permeable means of the transmission line. In this form a coupling means disposed adjacent the magnetic means couples the signal to the transmission line within the area of local saturation created by the magnetic means.

Other objects and advantages of the invention will be apparent from the following description, taken in conjunction with the accompanying drawings, wherein:

FIG. 5 is a fragmentary generally perspective view illustrating a length of the transmission line constructed in accordance with another form of the invention;

FIG. 6 is a fragmentary schematic illustration of one form of magnetic means and associated coupling means mounted on a train and disposed adjacent the transmission line; and FIG. 7 is a fragmentary schematic illustration of the novel system of the present invention in conjunction with a "zone" type detection.

Figure 1:
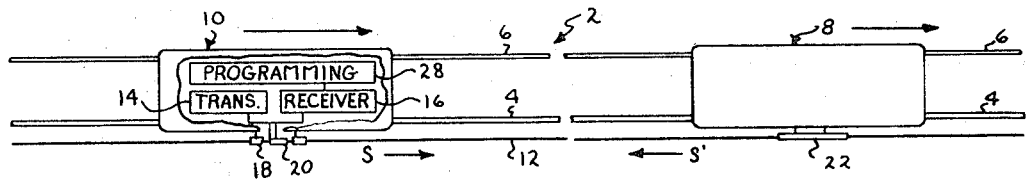
FIG. 1 is a fragmentary schematic illustration of the novel system of the present invention utilized in conjunction with a continuous ranging type of detection system.

Referring again to the drawings, and in general to FIG. 1 thereof, the system designated generally at 2, in one embodiment of the invention is operably shown in conjunction with a continuous ranging system. As shown, the system 2 includes track or rail sections 4 and 6 having an advance vehicle 8 (train) and a succeeding vehicle 10 (train) thereon and travelling in the direction of the arrows. A transmission means in the form of a magnetically shielded transmission line 12 (shown in detail in one embodiment in FIGS. 2 to 4) may be disposed adjacent to and extend generally parallel with one of the rails, such as 4, substantially throughout the length of the track. Conveniently, the transmission line 12 may be disposed laterally of one of the rails, as shown, or disposed between the rails, as desired. The succeeding vehicle 10 carries a transmitting means 14 and a receiving means 16 (or a transceiver). The transmitting means 14 includes means for generating an energy signal S which may be a pulse type signal or a modulated wave; either amplitude, phase, or frequency modulated. To this end, any suitable modulated transmitter may be utilized to produce the desired energy signal.

In accordance with an aspect of this invention signal coupling between the vehicle and the transmission line is provided by causing magnetic saturation of a localized area of the magnetic shield means of the transmission line and disposing a suitable signal coupling means adjacent such saturated area. To this end, the succeeding vehicle 10, for example, also carries a magnetic means 18 adapted to produce sufficient magnetic flux so as to magnetically saturate a local area of the magnetic shield means of transmission line 12 adjacent the rail vehicle as it travels along the right of way. The magnetic means 18 is preferably positioned in close proximity to the transmission line 12, so as to achieve the desired magnetic saturation of the magnetic shield means thereof. A coupling device 20 carried by the succeeding vehicle 10 is associated with the transmitting means 14 and receiving means 16 and is spaced in close proximity to the magnetic means 18 so that signal coupling is effected between the vehicle and the line in the area of the magnetic shield means thereof which is being saturated by the magnetic means 18. For example, this localized saturation of the magnetic shield means of the transmission line permits signal S and reflected signal S' to be coupled between the respective transmitting means 14 and receiving means 16 and the transmission line 12.

The advance vehicle 8 which travels ahead of the succeeding vehicle 10 also carries a similar magnetic means 22 adapted to produce a sufficient magnetic flux so as to magnetically saturate the magnetic shield means of the transmission line 12 in a local area adjacent the advance vehicle 8. This magnetic saturation of the magnetic shield means of the transmission line 12 causes discontinuity in the electrical constants of the line at the location of magnetic means 22 which in turn causes a reflection of any incoming signal S back along the line, as at S', in the direction of the succeeding vehicle 10. The reflected signal S' is coupled to the receiving means 16 by the coupling device 20 carried by the succeeding vehicle 10 as previously described. The received signal S' is fed to an indicator (not shown) which provides an output indicative of the time elaspsed between transmission and receipt of the signal according to standard radar procedures. Such output provides an indication of the distance between the vehicle and a vehicle in advance thereof. The output signal may then be fed to a suitable programming device 28 which automatically regulates the speed of the succeeding vehicle 10 in relationship to the desired ideal spacing between the vehicles for a given particular location along the right of way.

Figure 2:
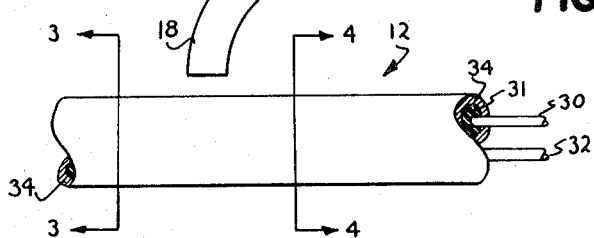
FIG. 2 is an enlarged fragmentary elevation view illustrating a length of one form of the transmission line of the invention.

In accordance with the invention and with reference to FIG. 2, the transmission line 12 in one embodiment may have the electrical conductors which carry the signal energy shielded by enclosing them in a cylindrical tube of magnetic material. As shown, transmission line 12 may comprise a pair of electrical conductors 30 and 32 maintained in side-by-side, spaced generally parallel relationship suitably electrically insulated by dielectric 31 and enclosed within an outer magnetic sheath or shield means 34. The conductors 30 and 32 are preferably made of a material having good electrical conductivity characteristics, such as copper or the like, and may be suitably dimensioned to provide the necessary electrical character for carrying signal energy. The outer surrounding magnetic shield means 34 may be of any suitable shape, such as cylindrical, and is made of a material having high magnetic permeability. Preferably, when the magnetic shield means 34 is employed as an electrical insulator, it may be made of a suitable ferrite material selected for its combined magnetic permeability and electrical insulating characteristics, such as iron ferrite or the like.

Figure 3:
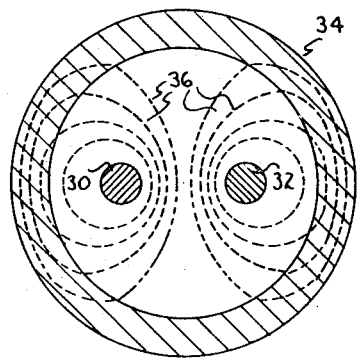
FIG. 3 is a vertical section view taken along the line 3—3 of FIG. 2, and illustrating the magnetic flux path at a selective point of non-saturation.

The mechanism of shielding may best be described by reference to FIGS. 3 and 4. As shown, signal energy in conductors 30 and 32 produces a magnetic field thereabout as depicted by the lines of force 36. As illustrated in FIG. 3, these lines of force are diverted from the region outside the transmission line because the magnetic shield means 34 (when unsaturated) offers a less magnetic resistance. That is, the high permeability magnetic shield means 34 acts as a low reluctance path for the magnetic flux about the conductors thereby diverting the flux away from the region outside the transmission line. When the magnetic shield means 34 is saturated, however, which is the condition illustrated in FIG. 4, it appears as a very high reluctance path so that the magnetic flux is no longer diverted thereby from the region outside the transmission line.

Since the lines of force extend outside the transmission line at the saturated region of the magnetic shield means signal coupling is possible at that saturated region between the vehicle and the transmission line. Accordingly, the energy signal S from transmitter means 14 may be readily coupled, such as by coupling device 20, from the transmission line 12 to the vehicle 10. Similarly, local saturation of the magnetic shield means 34 in an area in proximity to the advance vehicle 8 produces a similar change in the electrical character of the line, as shown in FIG. 4. In this case, moreover, the change in the magnetic flux pattern, 36, which is produced by the escape of an portion of the magnetic flux, changes the electrical constants of the transmission line 12 thus causing a reflection of the energy signal back along the transmission line toward the succeeding vehicle 10. This reflected signal is coupled to the receiving means 16 via the coupling device 20, as described.

It will be understood that not all of the lines of force are eliminated from the region external of the transmission line when the magnetic shield means is in its unsaturated state, but by appropriate design the residual field outside can be made very small. Moreover, although magnetic shield means 34 is illustrated as a single cylindrical tube, several concentric tubes with air space between adjacent tubes may be employed to provide more effective shielding if desired. As is known, multiple shields are more effective because they have more boundary surfaces to deflect the field.

Figure 4:
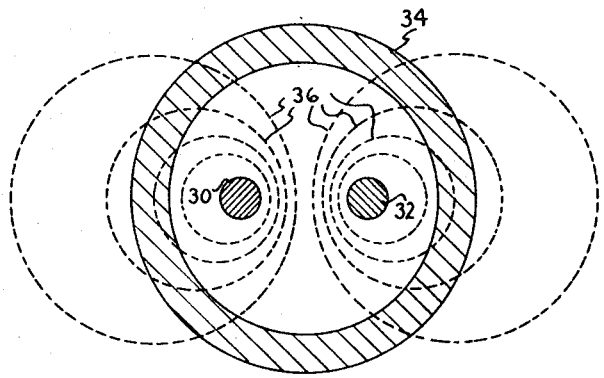
FIG. 4 is a vertical section view taken along the line 4—4 of FIG. 2 and illustrating the magnetic flux path at a selective point of saturation.

The arrangement shown in FIGS. 3 and 4, threfore, provides for a magnetically shielded transmission line wherein the magnetic shield means 34 functions both as an effective protective barrier against the adverse effects of weather and also confines the magnetic flux field of the conductors almost completely interiorly of the transmission line.

In FIG. 5 there is shown another embodiment of a transmission line which functions similarly to that shown in FIG. 2, except that the magnetic shield means is provided by a pair of rod-like members 40 and 42 of suitable magnetic material. As shown, members 40 and 42 may be disposed in generally laterally spaced, parallel relationship relative to one another. In this arrangement, electrical conductors 44 and 46 are preferably wound helically around each of the rod-like members 40 and 42. The rod-like members 40 and 42 are preferably made of a material having high magnetic permeability. The conductors 44 and 46 are suitably made from a good electrically conductive material, such as copper or the like. In this form, the conductors 44 and 46 are preferably wound in a manner to provide that the magnetic flux produced therein be in opposite directions. Accordingly, the magnetic field produced by an energy signal transmitted through the conductors 44 and 46 is confined to small loops, as shown by the lines of force 48. Preferably, the rod-like members 40 and 42 and the conductors 44 and 46 are enclosed in an outer sheath 50 of low-loss dielectric material to provide additional support and strength characteristics therefor, and to insulate the components from the attenuation effects of snow, ice and the like.

By the foregoing described arrangement, therefore, saturation of the magnetically permeable rod-like members 40 and 42 by the presence of a magnetic means, such as that of advance train 8, causes the constants of the transmission line 12 to be changed resulting in a reflection of the signal in the manner described.

In accordance with the invention, the magnetic means 18 and 22 may be of the permanent or electro-magnetic type. Where the electro-magnetic type means are employed a suitable source of electrical energizing power (not shown) may be mounted on the respective vehicles 8 and 10 for supplying the necessary power, as desired. Conveniently, the magnetic means 18 and 22 may be mounted on the respective vehicles by suitable brackets or the like (not shown) so as to be in proximity to, but preferably out of contact with the transmission line 12. Preferably, the magnetic means 18 and 22 are of a semicircular type construction as shown in FIG. 6 so as to direct the magnetic field into the transmission line 12.

It is preferred that the flux density produced by the magnetic means 18 and 22 in the magnetic shield means be greater than the amount theoretically needed for saturation in order to insure saturation. In addition, the magnetic shield means should be of a sufficiently high permeability to avoid saturation by stray magnetic fields in the vicinity. For example, in an arrangement such as that illustrated in FIG. 2, the relative permeability of the magnetic shield means 34 may be 500, the spacing of the magnetic means therefrom about 2 in. and the energy in the magnet gap may be 250 joules so as to produce a flux density of at least about 2000 gausses. The signal current preferably may be a conventional low amperage signal current such as of 0.1 ampere. The magnetic field produced by such a signal current provides less than 0.01 percent of the flux density needed for saturation of the magnetic shield means.

A suitable means for directing the signals ahead of the succeeding train 10 may be employed, such as, for example, one or more energy reflecting and absorbing devices mounted on the train rearwardly of the coupling device. Although the theoretical electrical spacing between the coupling device and the energy reflecting and absorbing devices should ideally be 0, ½, 1, 1½, etc. wavelength of the signal carrier, due to the distributed constants of the devices themselves, the spacing will generally be provided less than about ⅛ wavelength of the signal carrier. The reflecting and absorbing devices should be mounted opposite the transmission line in an area thereof which is within the area saturated by the magnetic means 18, otherwise additional magnetic means (not shown) must be mounted adjacent the reflecting and absorbing devices.

In an alternative arrangement, the advance vehicle 8 could be provided with receiving and/or transmitting means (not shown) for receiving and/or transmitting signals between the vehicles so as to provide a convenient means of inter-vehicle communication. Accordingly, since the advance vehicle 8 carries a magnetic means, such as 22, which locally saturates the magnetic shield means of the transmission line 12, a suitable coupling means (not shown), but comparable to the coupling means 20 upon the succeeeding vehicle 10, could be carried by the advance vehicle for conducting an energy signal between the line and the aforesaid transmitter and/or receiver. Such arrangement may be advantageous, for example, where conditions warrant a variation in spacing between the vehicles from that which has been pre-programmed. Moreover, a special signal from the advance vehicle could act as an over-ride to the pre-programming so as to vary the program in a desired manner, or the arrangement may be used for voice communication between the trains. A suitable means (not shown) for directing the communication signal, comparable to the above described reflecting device, would be mounted on the advance train 8 ahead of the coupling means and switched into operation by conventional switching means (not shown) when it is desired to send a signal rearward of the advance train 8.

Reflecting and absorbing means similar to the above described energy absorption device and energy reflecting device may be mounted on the advance train 8 to prevent the signal S from travelling ahead of advance train 8.

In FIG. 7 there is shown a modification of the system of FIG. 1 wherein the transmission line is arranged in a zone type system. In this arrangement, designated generally at 56, a series of transmission line segments, such as 58, 60, 62 etc., are provided corresponding a the number of zones, such as A, B, C etc. The transmission line segments which may be of the type illustrated in FIG. 2 or of the type shown in FIG. 5 are disposed in any suitable manner such as laterally of the track, as shown, or disposed between the rails 4 and 6.

In the arrangement illustrated in FIG. 7, the zones, such as A to C, include generally the same components so that the following description will proceed with reference to zone B and with the same components in each zone being identified by the same letter suffix. As shown, each zone includes a transmitting means 64 and a receiving means 66 (or a transceiver) for transmitting an energy signal S along the respective line segment 60 and for receiving the reflected signal. In zone B, therefore, there is shown a receiving means 66b of a suitable type having indicator means (not shown) which is well known in the art, for computing the time between transmission and receipt of the reflected signal, as disclosed in the U.S. Patent 2,702,342 to Korman. A reflecting means 68b, such as a suitable terminating impedance, may be disposed at the other end of transmission line segment 60 so as to reflect the produced signal back to the receiving means 66b, as indicated at S'. In the event that no vehicle is present in the zone, the indicator means will produce an output indicative of the time for the transmitted signal S transmitted by the transmission means 64b to travel to the end of the zone and be reflected by the reflecting means 68b. However, where a vehicle is present in the zone, the signal will be reflected by the discontinuity in the transmission line segment 60 caused by the presence of the magnetic means 70b carried by the passing vehicle. Such magnetic means corresponds to the type, such as 18 and 22 in FIG. 1 which acts to saturate the magnetically permeable components of the transmission line segment 60.

In the arrangement shown in FIG. 7, therefore, the indicator of the receiving means 66b will indicate reflection at a particular time which is less than the time required for transmission of the signal to the reflecting means 68b. Thus, the indicator will produce an output indicative of zone occupancy and of the distance which the passing vehicle is located from the transmitting means 64b within the zone. That is, an output will be provided which is indicative of the distance between transmitting means 64b and the vehicle in the zone. Suitable means (not shown but known in the art) may be provided for relaying the zone occupancy information to the succeeding train. For example, zone occupancy or non-occupancy information could be transmitted along the rails by suitable transmitters and receivers, (not shown).

In an alternative arrangement, the presence of a vehicle in a given zone could be determined by the absence of the normally present reflected energy. This could be accomplished by construction of the transmission line segments in a manner so that the presence of the magnetic means, such as 70b, causes an attenuation so that the receiving means 66b determines the presence of a vehicle by the absence of the reflected energy signal, as desired.

In accordance with the foregoing description and accompanying drawings, it will be seen that there is provided a system which incorporates a novel transmission line and coupling construction for the automatic and continuous control, detection, and/or communication with and between vehicles movable in the same direction along a track. In its broader aspects, it will be seen that the present invention provides a novel transmission and coupling arrangement which enables efficient coupling of an energy signal at any given point along the transmission line and in a manner so as to eliminate impedance changes, attenuation, and other such undesired characteristics due to advance weather conditions. It will be seen also that the novel transmission line and coupling arrangement disclosed can be effectively employed with conventional type signalling systems, such as the continuous radar and/or block type systems. It will also be seen that in addition to the vehicle control, detection and/or separation function, the novel transmission line and coupling arrangement can be advantageously employed for communication between vehicles or between a vehicle and fixed points. In addition, in the case of rail vehicles, the transmission line can be mounted in close proximity to the rails and ties and without the need for auxiliary protection equipment. Further, it will be seen that the system of the invention combines the desirable features of low-loss transmission in an organization that prevents "seeing around" an abvance train as is the case with heretofore known types of low-loss line systems having some form of antenna or the like.

Having shown preferred embodiments of the system embodied in the present invention, it is believed obvious that other modifications and variations of the invention are also possible in light of the above teachings. It is, therefore, to be understood that changes may be made in the particular embodiment of the invention described which are within the full intended scope of the invention as defined by the appended claims.

What I claim as new and desire to secure by Letters Patent of the United States is:

1. In a signalling system for vehicles travelling a prescribed route, the combination comprising: a transmission line disposed along said route and being adapted to carry signal energy; means adapted to couple signal energy to said transmission line; saturable magnetic shield means cooperatively associated with said transmission line for providing a low reluctance path for the lines of force produced about said transmission line due to the signal energy therein; magnetic means adapted to be mounted on said vehicle so as to be disposed in proximity to said transmission line as said vehicle travels along its route, said magnetic means being operative to cause saturation of only a localized region of said magnetic shield means to increase the reluctance of such localized region and effect a change in the characteristics of said transmission line so that at least a portion of said signal energy is reflected back toward the source thereof; and means for receiving said reflected signal energy at a location adjacent said source.

2. In a signalling system according to claim 1 including circuit means carried by said vehicle and being responsive to transmitted and reflected signal energy to produce a continuous electrical indication of the distance between said vehicle and the location of said localized saturated region of said magnetic shield means and consequently the distance between said vehicle and a vehicle in advance thereof.

3. In a signalling system according to claim 1 where in said means adapted to couple signal energy and said means for receiving reflected signal energy in said transmission line is disposed adjacent one end thereof with an energy reflecting means being disposed adjacent the other end of said transmission line.

4. In a signalling system for vehicles travelling a prescribed route, the combination comprising: a transmission line disposed along said route and being adapted to carry signal energy; saturable magnetic shield means cooperatively associated with said transmission line for providing a low reluctance path for the lines of force produced about said transmission line due to the signal energy therein; magnetic means adapted to be mounted on said vehicle so as to be in proximity to said transmission line as said vehicle travels along its route, said magnetic means being operative to cause saturation of only a localized region of said magnetic shield means to increase the reluctance of such localized region and allow for signal coupling between said vehicle and said transmission line at such localized saturated region; and means for coupling signals to or from said transmission line at said saturated localized region.

5. In a signalling system comprising: a transmission line having electrical conducting means adapted to carry signal energy; saturable magnetic shield means cooperatively associated with said electrical conducting means for providing a low reluctance path for the lines of force about said electrical conducting means due to the signal energy therein; and at least one means operative to cause saturation of only a localized region of said magnetic shield means increasing the reluctance thereof at such localized region and producing a change in the characteristics of the transmission line.

6. In a signalling system according to claim 5 wherein said means operative to cause saturation of only a localized region of said magnetic shield means is located external of said transmission line.

7. In a signalling system according to claim 5 wherein said means operative to cause saturation of only a localized region of said magnetic shield means is a source of magnetic flux.

8. In a signalling system according to claim 4 wherein said saturable magnetic shield means is in the form of a cylindrical tube of high initial permeability magnetic material disposed in spaced encompassing relationship about the electrical conducting means of said transmission line.

9. In a signalling system according to claim 4 wherein said saturable magnetic shield means is in the form of spaced-apart parallel rods of high initial permeability magnetic material and said electrical conducting means is disposed in encompassing relationship around said rods.

10. In a signalling system according to claim 4 wherein said magnetic shield means is an electrical insulator.

11. In a signalling system comprising: a transmission line having electrical conducting means adapted to carry signal energy; saturable magnetic shield means cooperatively associated with said electrical conducting means for providing a low reluctance path for the lines of force about said electrical conducting means due to the signal energy therein so that there is only a small residual field in the region external of said transmission line; and at least one means operative to cause saturation of only a localized region of said magnetic shield means increasing the reluctance thereof at such localized region and producing a change in the characteristics of the transmission line and an increase in the field in the region external of said transmission line at such saturated region so that signal energy may be coupled to or from the electrical conducting means at said saturated localized region; and energy coupling means proximate said means for causing saturation of only a localized region of said magnetic shield means for coupling signal energy to or from said transmission line at the saturated localized region.

References Cited

UNITED STATES PATENTS 2,698,377   12/1954   Korman.
3,351,938   11/1967   Gray _____ 343—6.5

RODNEY D. BENNETT, Jr., Primary Examiner

J. P. MORRIS, Assistant Examiner

U.S. Cl. X.R.

343—6.5